United States Patent
Fulbright et al.

(10) Patent No.: US 6,170,572 B1
(45) Date of Patent: Jan. 9, 2001

(54) PROGRESSING CAVITY PUMP PRODUCTION TUBING HAVING PERMANENT ROTOR BEARINGS/CORE CENTERING BEARINGS

(75) Inventors: Gene Ray Neil Fulbright, Catoosa; Michael James Everett, Chelsea; John Allen Rogers, Claremore, all of OK (US)

(73) Assignee: Delaware Capital Formation, Inc., Wilmington, DE (US)

( * ) Notice: Under 35 U.S.C. 154(b), the term of this patent shall be extended for 0 days.

(21) Appl. No.: 09/320,368

(22) Filed: May 25, 1999

(51) Int. Cl.[7] .................. E21B 43/00; F03C 2/08
(52) U.S. Cl. ................ 166/68.5; 166/105; 418/48
(58) Field of Search ................ 166/68, 68.5, 105, 166/241.1; 418/48, 152, 153, 178

(56) References Cited

U.S. PATENT DOCUMENTS

| | | |
|---|---|---|
| 2,456,227 | 12/1948 | Wade . |
| 2,496,292 | 2/1950 | Hook . |
| 2,505,136 | 4/1950 | Moineau . |
| 2,924,180 | 2/1960 | Bourke et al. . |
| 3,354,537 | 11/1967 | O'Connor . |
| 3,499,389 | 3/1970 | Seeberger et al. . |
| 4,558,954 | 12/1985 | Barr . |
| 4,773,489 | 9/1988 | Makohl . |
| 4,991,292 | 2/1991 | Bostel . |
| 5,143,153 | * 9/1992 | Bach et al. ............ 166/68.5 |
| 5,209,294 | 5/1993 | Weber . |
| 5,611,397 | * 3/1997 | Wood ..................... 166/68 |
| 5,725,053 | 3/1998 | Weber . |
| 5,807,087 | 9/1998 | Brandt et al. . |
| 5,823,261 | 10/1998 | Drumheller . |
| 6,019,583 | * 2/2000 | Wood ..................... 418/48 |
| 6,041,856 | * 3/2000 | Thrasher et al. ........ 166/53 |

* cited by examiner

Primary Examiner—Frank Tsay
(74) Attorney, Agent, or Firm—Fellers, Snider, Blankenship, Bailey & Tippens, P.C.

(57) ABSTRACT

A method of limiting core deflection in the manufacture of relatively long sections of progressing cavity pump production tubing wherein a core is held within the bore of a length of tubular casing to provide a form for the molding of a stator element. The core is centered and stabilized within the tubular casing at selected intervals prior to the injection of elastomeric material by one or more core centering bearings. The bearings are effective to prevent core deflection during manufacture and, rather than being removed after curing of the stator, are left in the casing to function as rotor bearings for the progressing cavity pump. The bearings, themselves encapsulated by elastomeric material during the manufacturing process, help maintain the rotor in optimal alignment within the production tubing thereby benefitting pump performance and longevity.

16 Claims, 3 Drawing Sheets

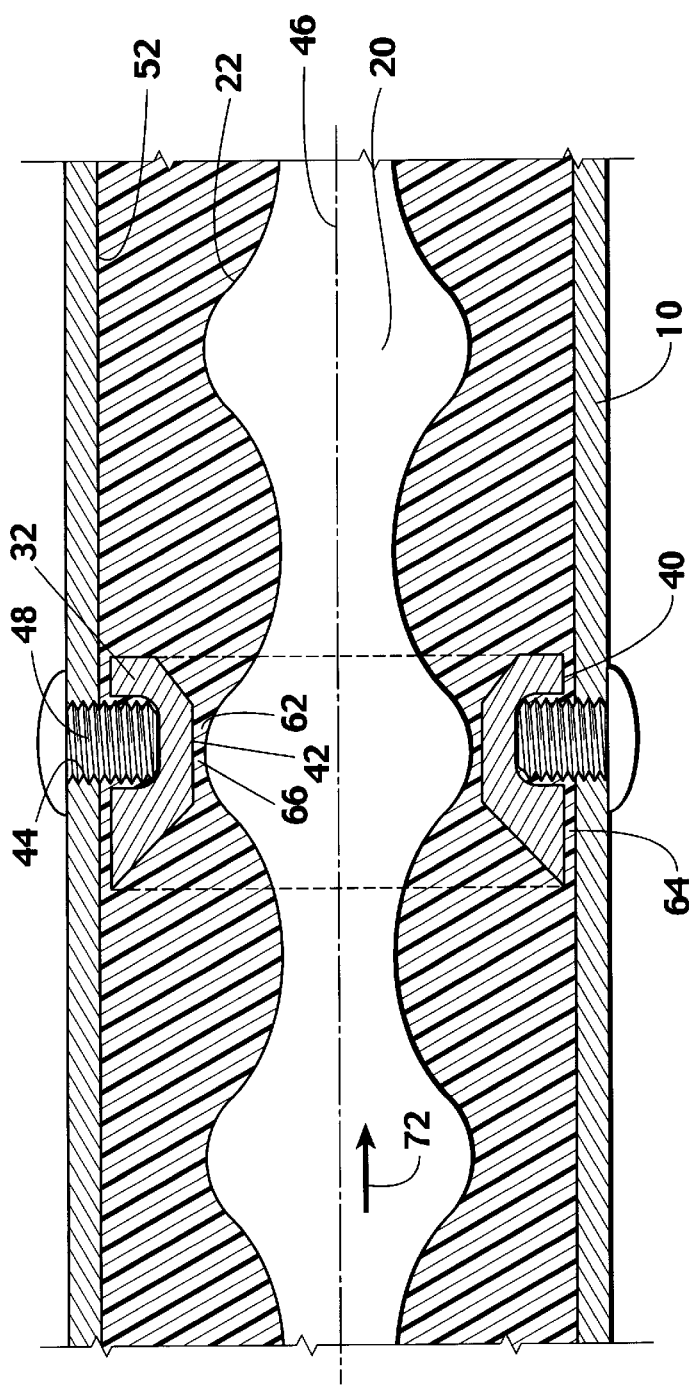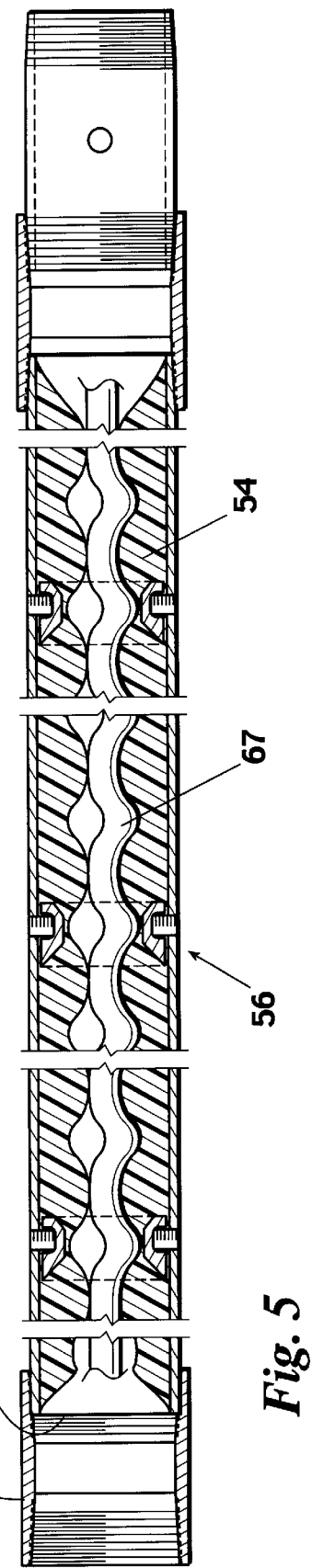

PROGRESSING CAVITY PUMP PRODUCTION TUBING HAVING PERMANENT ROTOR BEARINGS/CORE CENTERING BEARINGS

BACKGROUND OF THE INVENTION

1. Field of the Invention

This invention relates generally to production tubing for Moineau-type progressing cavity pumps, and, more specifically, to minimizing core deflection in the manufacture of stators for relatively long sections of production tubing and providing rotor bearing surfaces at periodic intervals in the manufactured production tubing.

2. Background

A progressing cavity pump is a positive displacement pump particulary adaptable for pumping viscous, abrasive or corrosive liquids. Rene J. L. Moineau is credited with conceiving the progressing cavity pump in 1932. Such pumps are occasionally referred to as single screw pumps. This name arises since the rotor of a typical progressing cavity pump is a single helix which rolls eccentrically in a stator having a cavity forming a double helix. This single helix rotor/double helix stator combination creates pockets which are moved (progressed) linearly from an inlet end to a discharge end of the pump as the rotor is turned.

Applications for progressing cavity pumps fall into two general categories, that is, metering or liquid transfer. Progressing cavity pumps function exceptionally well for metering purposes since they deliver a highly reliable predetermined quantity of liquid for each revolution of the pump rotor. By accurately governing the rate of revolution of the pump rotor, the quantity of liquid delivered by a progressing cavity pump can be accurately repeated. For this reason, progressing cavity pumps are frequently employed in chemical processing systems wherein accurate proportional blending or mixing of liquid components is required.

The other basic application for progressing cavity pumps is for liquid transfer using either a constant speed or a variable speed drive. These pumps adapt well to many speciality applications, such as handling abrasive, viscous and two-phase fluids. Progressing cavity pumps can be employed for pumping fluids having a viscosity less than one centipoise.

The progressing cavity pump rotor is generally configured with a single screw thread of streamlined design without sharp edges functioning inside the cavity of the stator, the interior wall of which defines the elongated double helix. The rotor and stator are positioned within a length of production tubing (the pump barrel), the rotor being driven by a drive shaft connected to a motor. While the stator can be formed of metal, the most common method of manufacturing progressing cavity pumps is to make the stator of an elastomeric material. The combination of a metallic rotor and an elastomeric stator functions advantageously to provide a pump having great capacity to pump abrasive fluids and to maintain a predetermined discharge pressure.

Typically, the maximum pressure that a progressing cavity pump can deliver is directly related to the length of the rotor and stator, and, accordingly, in some applications, such as downhole submersible pumps for the oil field, the rotor and stator can be relatively long compared to their diameters.

Conventionally, the manufacture of production tubing involves vertically supporting a length of tubular casing on an injection plate and fixing a core centrally within the casing coincident to the longitudinal axis of the casing. Elastomeric material is then injected under very high pressure into the casing, the inside surface of which has been treated with a bonding material. The elastomeric material flows upward around the core to form the stator after curing.

A significant problem in the manufacture of relatively long stators is that the core tends to deflect within the tubular casing during the injecting step. The core is prone to move to one side or the other in response to the very high pressure of the injected elastomeric material. Moreover, if a horizontal injection process is used, the core may deflect or bow due to its own weight. Core deflection results in crooked stators and larger tolerances which, in turn, detrimentally affect pump performance.

Prior attempts to correct the problem of core deflection include drilling and tapping a hole in the casing and inserting set screws against the core to maintain its position during the molding process or using a sliding "pig" or disk, essentially a ring, to ride on top of the column of injected elastomeric material to assist the core in maintaining a central alignment. These methods, however, have not achieved great success in preventing core deflection and have significant drawbacks, such as tooling damage caused by the set screws, wobbling or sticking of the sliding ring during the injection process, and the need to recover the ring after manufacture. For these reasons, there remains a need for efficiently and reliably centering the core within a long length of casing during stator formation.

Another problem regularly encountered in long lengths of production tubing involves the misalignment of the rotor within the stator cavity. Preferably there should be an equal interference between the rotor and stator around the entire circumference of the rotor to ensure optimum pump performance. Should the rotor wobble or "chunk out" to one side of the stator cavity the pump loses the beneficial equal interference and performance is degraded. If areas of significant interference are created by the misalignment the torques required to operate the pump increase to the detriment of the system.

SUMMARY OF THE INVENTION

We have developed a method of manufacture in which the core is centered and stabilized within the tubular casing at selected intervals prior to the injection of elastomeric material by one or more core centering bearings. The bearings are effective to prevent core deflection during manufacture and, rather than being removed after curing of the stator, are left in the casing to function as rotor bearings for the progressing cavity pump. The bearings, themselves encapsulated by elastomeric material during the manufacturing process, help maintain the rotor in optimal alignment within the production tubing thereby benefitting pump performance and longevity.

More fully described, the inventive method is implemented in the manufacture of relatively long sections of progressing cavity pump production tubing wherein a core is held within the bore of a length of tubular casing to provide a form for the molding of a stator element. One or more cylindrical bearings are permanently mounted within the tubular casing, preferably prior to the insertion of the core within the casing. Each of the bearings has an outer diameter marginally smaller than the inner diameter of the casing so as to be concentrically received therein. The inner diameter of the bearing is marginally greater than the outer diameter of the core (which corresponds to the outer diameter of a complementary rotor). A flow of elastomeric material is injected into the casing to form the stator element. The flow encapsulates each bearing with elastomeric material so that a layer of elastomeric material covers substantially all of the innermost surface of the bearing.

To restrain the bearings within the casing during the injecting step, it is preferred that one or more holes be drilled and tapped into the casing at the desired location in a plane transverse to the longitudinal axis of the casing to receive set screws. Preferably, each bearing possesses an outer circumferential groove to receive and seat the set screws. Damage to the outer surface of the core is thereby avoided.

Because the outer and inner diameters of the bearings are marginally smaller than the inner diameter of the casing and outer diameter of the core, respectively, two small spaces are created once the bearings have been located and restrained within the casing and the core has been inserted. A first space is defined between the outermost surface of each bearing and the inner surface of the casing while a second space is defined between the innermost surface of each bearing and the outer surface of the core. As elastomeric material is injected into the casing, the elastomeric material flows through the first and second spaces whereby upon completion of the injecting step, the bearing is substantially encapsulated by elastomeric material.

In another preferred aspect of the invention, each bearing possesses an inner circumferential chamfer. The chamfered end of the bearing is directed to first receive the flow of elastomeric material so as to decrease the impedance of the flow and provide a holding surface for the elastomeric material. To maintain a smaller bearing surface against the rotor of the progressing cavity pump, and to thereby decrease working torques, it is particularly preferred that each end of the bearing possess an inner circumferential chamfer. In the most preferred embodiment, one end of the bearing has a chamfer of greater length than the other, and the end having the chamfer of greater length is directed to first receive the flow of elastomeric material.

The bearings, being encapsulated in the elastomeric material and restrained by set screws, are not removed from the casing after manufacture, but are left in the casing and thereafter function as rotor bearings to provide additional support to the progressing cavity pump rotor during use. Thus, the invention also provides inventive production tubing for a progressing cavity pump.

A better understanding of the present invention, its several aspects, and its objects and advantages will become apparent to those skilled in the art from the following detailed description, taken in conjunction with the attached drawings, wherein there is shown and described the preferred embodiment of the invention, simply by way of illustration of the best mode contemplated for carrying out the invention.

BRIEF DESCRIPTION OF THE DRAWINGS

FIG. 4 is a cross section of a length of production tubing illustrating the use of the preferred core centering/rotor bearing.

FIG. 5 is a cross section showing a long length of production tubing possessing several core centering/rotor bearings.

DETAILED DESCRIPTION OF THE PREFERRED EMBODIMENT

Figure 1:
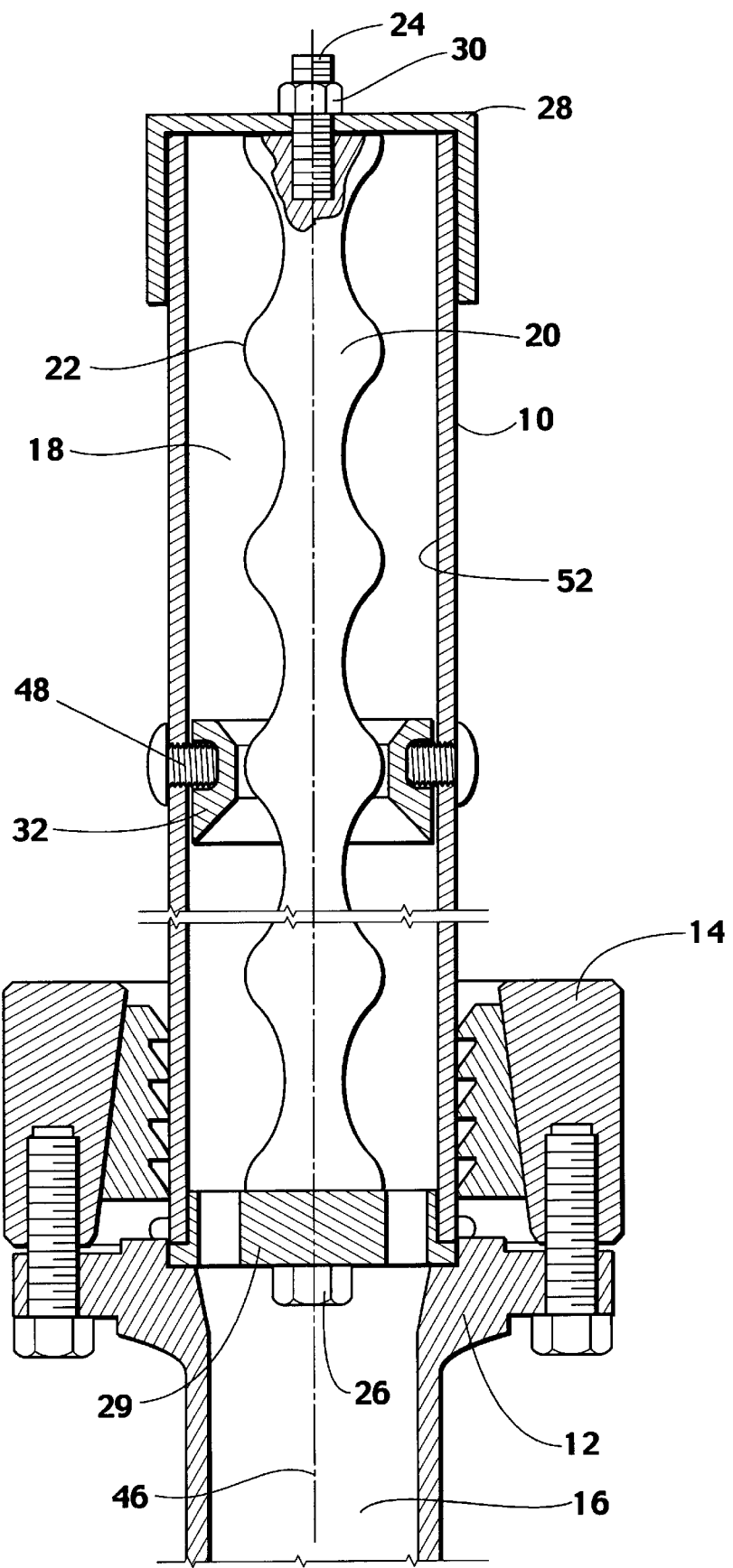
FIG. 1 is a cross section of a manufacturing assembly employing the present invention in the making of a stator in a length of casing.
Figure 2:
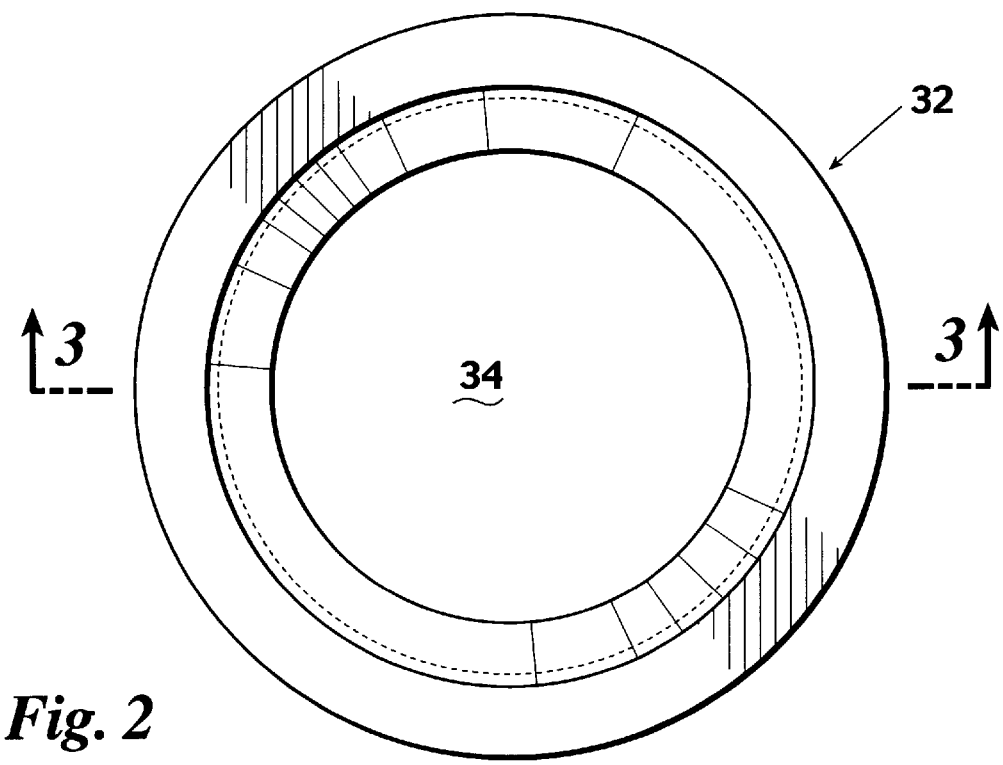
FIG. 2 is a top view of the preferred core centering/rotor bearing.

Referring now to the drawings, wherein in like reference numerals designate identical or corresponding parts throughout the several views, and specifically to FIG. 1 which exemplifies a manufacturing assembly employing the present invention, a tubular casing 10 is vertically supported upon an injection fixture 12 by a pipe retention mechanism 14. The injection fixture 12 has a passageway 16 for delivering elastomeric material from a source (not shown) into the bore 18 of the casing 10. Vertically supported coaxially within the casing 10 is a core 20. The outer surface 22 of the core functions as a mold to define the desired double helix configuration of the interior wall of the stator cavity. The core 20 is supported in the manufacturing assembly by bolts 24, 26. At the top end of the assembly the casing 10 is closed off by a topcap 28 held rigidly in place by a bolt 24 and nut 30 combination. A perforated bottom plate 29 supports the casing 10 upon the injection fixture 12.

Within the bore 18 of the casing 10, and at one or more desired locations along the extent of the casing 10 as may be necessary due to the length of the casing 10 and core 20, there is provided in accordance with the present invention one or more core centering/rotor bearings 32. Referring now to the remainder of the drawing figures, the bearing 32 is cylindrical or tubular in shape having a bore 34 therethrough. It is preferably machined from brass, although other metals, Teflon or hard plastics may be utilized alternatively. As best shown in the cross section of FIG. 3, the bearing 32 has a first end 36, a second in 38, an outermost surface 40, and an innermost surface (or rotor bearing surface) 42. The outer diameter of the bearing 32 is marginally smaller than the inner diameter of the casing 10 so as to be concentrically received therein as illustrated in the figures. As shown best in FIG. 1 and FIG. 4, the inner diameter of the bearing 32 is marginally greater than the outer diameter of the core 20 at its widest point. This allows for the easy placement of the bearing 32, and subsequently the core 20, within the casing and enables use of the invention with existing tooling.

The bearing 32 is preferably mounted within the casing 10 by drilling and tapping one or more, preferably three, holes 44 in the casing 10 at the desired location, the holes 44 being spaced around the casing 10 in a plane transverse to the longitudinal axis 46 of the casing 10, and inserting one or more, preferably three, set screws 48 through the holes 44 to restrain the bearing 32 where desired. The bearing 32 preferably possesses an outer circumferential groove 50 to receive and seat the set screws 48 in order to better restrain the bearing 32 against the tremendous pressures encountered during the injection of the elastomeric material.

The tubular casing 10 is prepared for the injection of elastomeric material by sandblasting or glass-bead-blasting the inner surface 52 of the casing 10 until a white metal finish is obtained. The surface 52 is then cleaned with a degreasing composition and coated with a bonding agent. At predetermined locations, depending upon the length of the particular casing and the anticipated deflection to be encountered in the core 20, one or more sets of holes 44 are drilled and tapped to receive the set screws 48.

Each bearing 32 is prepared in a fashion similar to the inside surface 52 of the casing 10. The bearing 32 is first lightly sandblasted or glass-bead-blasted. It is then cleaned with a degreasing solution, coated with a bonding agent and located within the casing 10 at the desired location. The bearing 32 may be positioned with the bore 18 of the casing 10 with a reach-rod or other centering device that allows for the proper placement of the bearing 32 within the bore 18 of the casing 10 such that alignment is achieved between the holes 44 and the circumferential groove 50.

Once the bearings 32 have been properly located and restrained with the set screws 48, the core 20 is inserted coaxially within the casing and secured by bolts 24, 26, topcap 28 and bottom plate 29. At this point the assembly (comprising the casing 10, the mounted bearing(s) 32, the mounted core 20 and the topcap 28 and bottom plate 29) is preheated, as is well known in the art, to facilitate the injection of molten elastomeric material. The temperature to which the assembly is preheated is dependant upon the type of elastomeric compounds to be utilized in forming the stator element and is within the skill of the art. After being preheated, the assembly is affixed to the injection fixture 12, such as by the pipe retention mechanism 14.

Particular attention is now directed to FIG. 4. Elastomeric material is injected through the passageway 16 of the injection fixture 12 so as to traverse upward through the bore 18 of the casing 10 to fill the space between the inner surface 52 of the casing 10 and the outer surface 22 of the core 20. Once injected (and after curing), the elastomeric material forms the stator 54. After the completion of the injecting step, the assembly is removed from the injection fixture 12 and transferred into an autoclave for curing. Cure time and temperature is, of course, also dependent upon the particular elastomeric compound utilized as well as the diameter and length of the casing 10. After curing, the assembly is cooled and all tooling is removed to obtain a length of production tubing 56 (FIG. 5). As shown in FIG. 5, the ends 58 of the production tubing 56 may be machined such as to threadably receive a coupler 60 or to otherwise be joined to additional sections of production tubing or linkages as is well known in the art to form a relatively long progressing cavity pump. The heads of the set screws 48 are preferably ground down and smoothly welded to the outside of the casing 10.

Referring back to FIG. 4, it is preferred that an outer layer of elastomeric material 62 be provided over most of the bearing surface 42 of the bearing 32, and it is most preferred that the bearing 32 be completely encapsulated by the elastomeric material. This is achieved during the injecting step when there exists a tolerance between the bearing 32 and the adjacent structure. FIG. 4 shows a space 64, defined on one side by the outermost surface 40 of the bearing 32 and on the other side by the inner surface 52 of the casing 10, filled with elastomeric material, and in like manner a similarly filled space 66 defined on one side by the innermost surface 42 of the bearing 32 and on the other side by the outer surface 22 of the core 20. In the most preferred embodiment the spaces 64, 66 are on the order of 3 to 5 thousandths of an inch in width. Covering most of the innermost surface 42 of the bearing 32 with elastomeric material is advantageous insofar as the thin layer of elastomeric material filling the space 66 helps to provide a good interface between the rotor 67 (FIG. 5) and stator 54 and resists abrasions such as might otherwise be caused by suspended solids in the fluid being pumped. Pertaining to the use herein of the terms "substantially" or "most of" as applied to the covering of elastomeric material over the innermost surface 42 of the bearing 32, it is to be recognized and appreciated that at the point where the innermost surface 42 of the bearing 32 is closest to the core 20, i.e. adjacent the widest portion of the core 20, there may be very little or no elastomeric material applied. This is due to the close tolerance between the surface 42 and the core 20. Moreover, if a thin layer of elastomeric material is applied during the manufacturing process, it may wear so as to expose a small circumferential area of bronze bearing surface. In either instance, the object of the invention to provide a bearing surface for the rotor is no less achieved.

Figure 3:
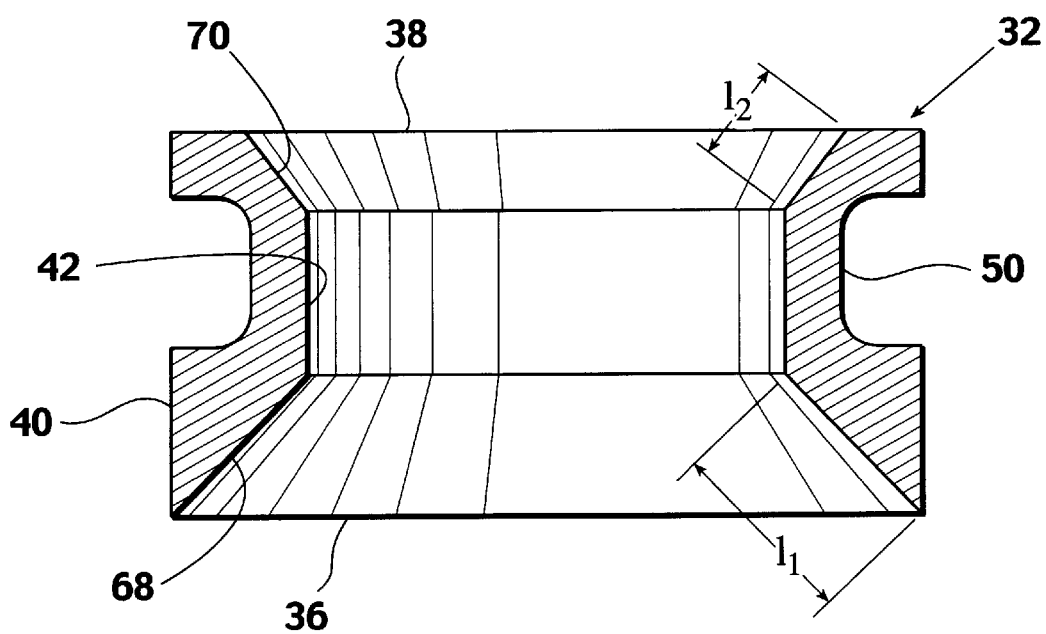
FIG. 3 is a cross section taken along line 3—3 of FIG. 2.

Another preferred aspect of the invention is best shown in FIGS. 3 and 4. In this regard it is preferred that one end, i.e. first end 36, of the bearing 32 possess an inner circumferential chamfer 68, and, in the most preferred embodiment, that the second end 38 of the bearing 32 possess a second inner circumferential chamfer 70. Moreover, most preferred is a bearing 32 wherein the first chamfer 68 is of a length $l_1$ that is greater than the length $l_2$ of the second chamfer 70 and wherein the bearing 32 is mounted in the casing with the end 36 having the longer first chamfer 68 directed to first receive the flow of elastomeric material, as illustrated in FIG. 4 wherein the arrow 72 designates the direction of flow.

Several advantages are obtained by a bearing 32 having the preferred chamfers 68, 70. The chamfers 68, 70 decrease the resistance to the flow of elastomeric material during the injecting step and prevent a peeling or flaking back of the material. The chamfers 68, 70 also provide a good grabbing and holding surface for the elastomeric material which helps to lock and stabilize the bearing 32 within the stator 54. The chamfers 68, 70 also reduce the dimensions of the bearing surface 42 which keeps operating torques at or below those of production tubing where no bearing is utilized. The chamfers 68, 79 further minimize any distortion in the double helix form of the stator 54.

In the foregoing manner, the aforedescribed invention achieves good success in minimizing core deflection in the manufacture of stators for relatively long sections of progressing cavity pump production tubing and provides a beneficial bearing surface for the rotor of the progressing cavity pump. With the invention a desirable interface is established between the rotor and stator and proper alignment is preserved. The maintenance of equal interference between the rotor and stator improves pump performance and longevity. The bearings prevent the rotor from wobbling or chunking out to one side while having no adverse impact on the torques required to operate the pump.

While the invention has been described with a certain degree of particularity, it is understood that the invention is not limited to the embodiment(s) set for herein for purposes of exemplification, but is to be limited only by the scope of the attached claim or claims, including the full range of equivalency to which each element thereof is entitled.

What is claimed is:

1. A method of limiting core deflection in the manufacture of relatively long sections of progressing cavity pump production tubing wherein a core is held within the bore of a length of tubular casing to provide a form for the molding of a stator element, comprising the steps of:

permanently mounting within the tubular casing one or more cylindrical core centering bearings, the bearings each having an outer diameter marginally smaller than the inner diameter of the casing so as to be concentrically received therein and an inner diameter marginally greater than the outer diameter of the core;

injecting into the tubular casing a flow of an elastomeric material to form the stator element within the tubular casing.

2. The method according to claim 1, further comprising the additional steps of:

drilling and tapping one or more holes in the casing at a desired location in a plane transverse to the longitudinal axis of the casing; and restraining the core centering bearing at the desired location with one or more set screws inserted through the holes.

3. The method according to claim 2, wherein the core centering bearing possesses an outer circumferential groove and wherein the set screw is seated in the groove to restrain the core centering bearing.

4. The method according to claim 1, wherein the core centering bearings are mounted in the casing prior to the insertion of the core within the casing.

5. The method according to claim 1, wherein a first space is defined between the outermost surface of each bearing and the inner surface of the casing and a second space is defined between the innermost surface of each bearing and the outer surface of the core and wherein during the injecting step the elastomeric material flows through at least the second space whereby upon completion of the injecting step the second space is filled with elastomeric material.

6. The method according to claim 5, wherein during the injecting step the elastomeric material flows through the first and second spaces whereby upon completion of the injecting step the core centering bearing is encapsulated by the elastomeric material.

7. The method according to claim 1, wherein one end of the core centering bearing possesses an inner circumferential chamfer and wherein the method further comprises mounting the bearing in the casing with the chamfered end directed to first receive the flow of elastomeric material.

8. The method according to claim 1, wherein each end of the core centering bearing possesses an inner circumferential chamfer.

9. The method according to claim 8, wherein the chamfer on one end of the core centering bearing is of a greater length than the other chamfer and wherein the method further comprises mounting the bearing in the casing with the end having the chamfer of greater length directed to first receive the flow of elastomeric material.

10. Production tubing for a progressing cavity pump, the tubing comprising a tubular casing to the inside surface of which is bonded a stator element and further comprising one or more cylindrical rotor bearings, the bearings each having an outer diameter marginally smaller than the inner diameter of the casing so as to be concentrically received therein and an inner diameter marginally greater than the outer diameter of a complementary rotor and being permanently mounted within the casing.

11. The production tubing according to claim 10, wherein the casing possesses one or more tapped holes at a desired location in a plane transverse to the longitudinal axis of the casing and further comprising one or more set screws inserted through the holes to restrain the rotor bearing.

12. The production tubing according to claim 11, wherein the rotor bearing possesses an outer circumferential groove and wherein the set screw is seated in the groove to restrain the core centering bearing.

13. The production tubing according to claim 10, further comprising a layer of elastomeric material covering the innermost surface of each bearing.

14. The production tubing according to claim 13, wherein a space is defined between the outermost surface of each bearing and the inner surface of the casing and further comprising a layer of elastomeric material occupying the space whereby the bearing is encapsulated by elastomeric material.

15. The production tubing according to claim 10 wherein one end of the core centering bearing possesses an inner circumferential chamfer.

16. The production tubing according to claim 10 wherein each end of the core centering bearing possesses an inner circumferential chamfer.

* * * * *